(12) United States Patent
Bunn

(10) Patent No.: US 6,497,818 B1
(45) Date of Patent: Dec. 24, 2002

(54) BREWING FUNNEL HAVING A LIQUID SHIELD

(75) Inventor: Arthur H. Bunn, Springfield, IL (US)

(73) Assignee: Bunn O. Matic Corp., Springfield, IL (US)

(*) Notice: Subject to any disclaimer, the term of this patent is extended or adjusted under 35 U.S.C. 154(b) by 0 days.

(21) Appl. No.: 09/772,515

(22) Filed: Jan. 29, 2001

Related U.S. Application Data

(63) Continuation-in-part of application No. 29/125,043, filed on Jun. 16, 2000, now Pat. No. Des. 439,798.

(51) Int. Cl.[7] .................. B01D 24/42; B01D 29/085; A47J 31/06; A47J 31/44
(52) U.S. Cl. .................. 210/238; 210/248; 210/455; 210/456; 210/464; 210/470; 210/481; 210/483; 220/731; 99/279; 99/304; 99/306; D7/400; D7/667; D7/700
(58) Field of Search ................ 210/470, 473, 210/476, 481, 455, 464, 483, 484, 238, 248, 281, 456; 99/300, 304, 306, 279; D7/667, 700, 396.3, 399, 400–401; 222/566, 571, 572; 220/704, 716, 73, 719, 733–734, 710, 694

(56) References Cited

U.S. PATENT DOCUMENTS

| | | | |
|---|---|---|---|
| 325,842 A | * 9/1885 | Knapp | |
| 590,336 A | * 9/1897 | Rossi | |
| D29,059 S | 7/1898 | Donaldson | |
| 737,014 A | * 8/1903 | O'Neill | |
| 1,756,249 A | * 4/1930 | Kaufman | |
| 1,841,664 A | * 1/1932 | Shield | |
| 2,174,228 A | 9/1939 | Perkins | 226/38 |
| 2,660,333 A | * 11/1953 | Paxton | |
| 3,360,161 A | * 12/1967 | Smith | |
| 3,399,780 A | 9/1968 | Macaluso, Jr. et al. | 210/469 |
| 3,943,058 A | 3/1976 | Wurm | 210/456 |
| 3,944,112 A | * 3/1976 | Miller | |
| 4,009,802 A | * 3/1977 | Hayduchok | |
| 4,414,884 A | 11/1983 | McLean | 99/304 |
| 4,850,501 A | * 7/1989 | Shield | |
| D315,475 S | 3/1991 | Finger et al. | D7/392 |
| 4,999,470 A | 3/1991 | Fuchs, Jr. | 219/10.55 E |
| 5,064,533 A | 11/1991 | Anson | 210/232 |
| 5,170,902 A | * 12/1992 | Wilson | |
| D339,028 S | 9/1993 | Bannigan | D7/400 |
| RE34,473 E | 12/1993 | Ryan et al. | 99/307 |
| 5,294,014 A | * 3/1994 | Wyatt et al. | |
| 5,590,581 A | 1/1997 | Strub et al. | 99/302 R |
| 5,618,106 A | * 4/1997 | Madera | |
| 5,865,095 A | 2/1999 | Mulle | 99/293 |
| 6,055,900 A | * 5/2000 | Bunn | 99/279 |

\* cited by examiner

*Primary Examiner*—Matthew O. Savage
*Assistant Examiner*—Marianne Ocampo
(74) *Attorney, Agent, or Firm*—Barnes & Thornburg

(57) ABSTRACT

A liquid shield and a funnel in combination with the liquid shield is disclosed. The funnel includes at least one side wall defining a cavity within the funnel and it has a drain opening generally on the bottom surface of the funnel. A rim along the upper edge of the side wall defines a mouth of the funnel. A handle is provided on the funnel. Spaced apart receptacles are positioned on the side wall in relation to the handle. The liquid shield includes a body portion which extends over at least a portion of the cavity of the funnel and is positioned adjacent the handle. The shield includes attachment portions extending from the body which are engageable with the receptacles for removably retaining the shield on the funnel. A flange extends from a portion of the shield and abuts an inside surface of the side wall of the funnel generally blocking passage of material between the shield and the funnel.

10 Claims, 2 Drawing Sheets

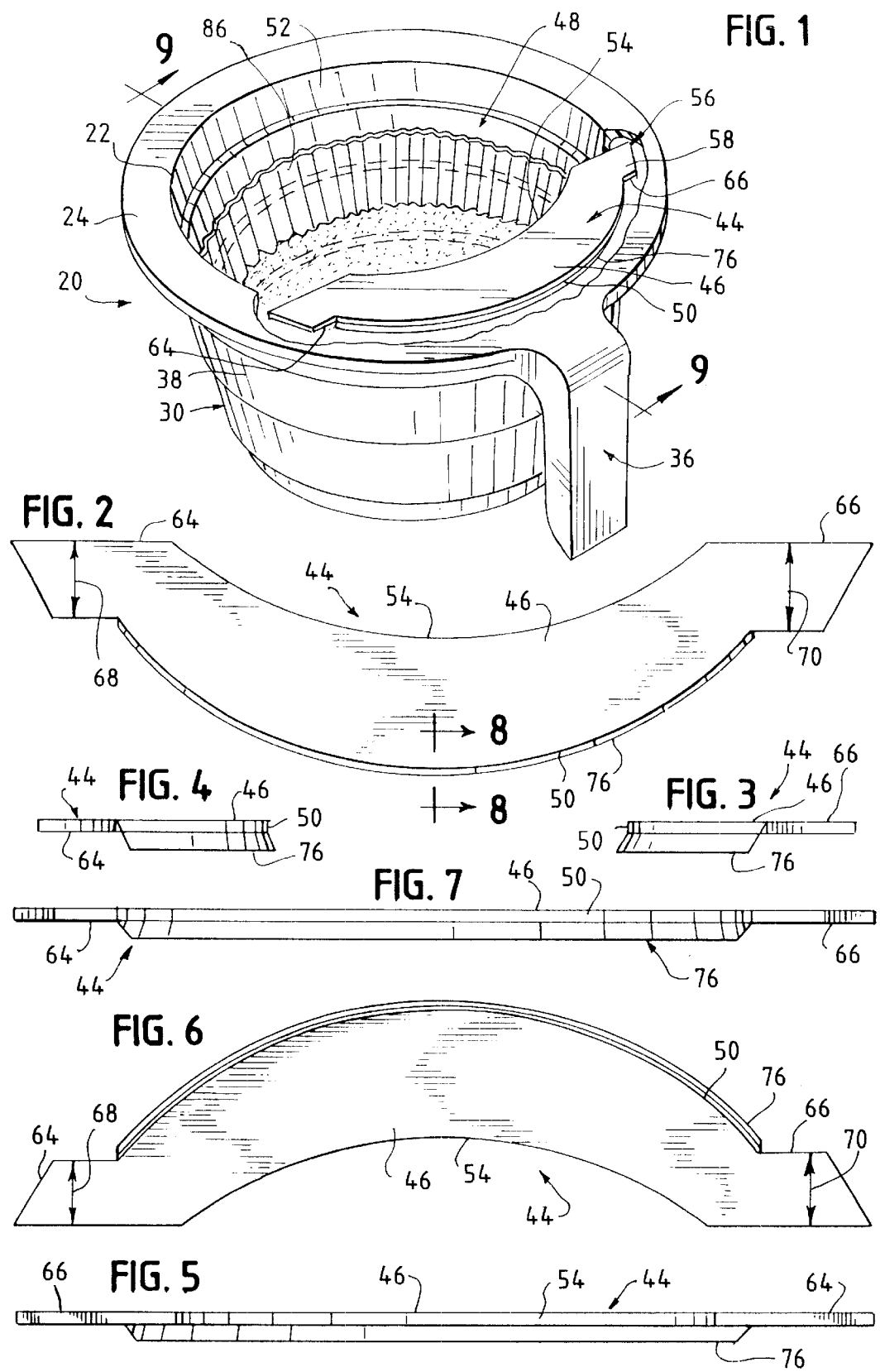

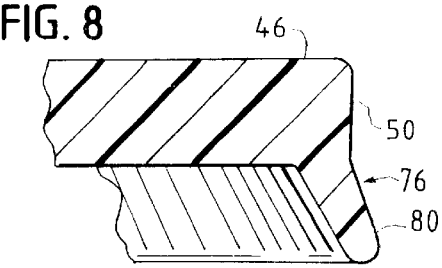
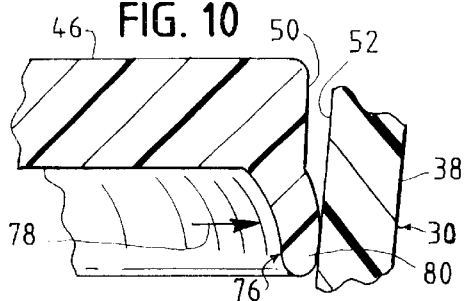
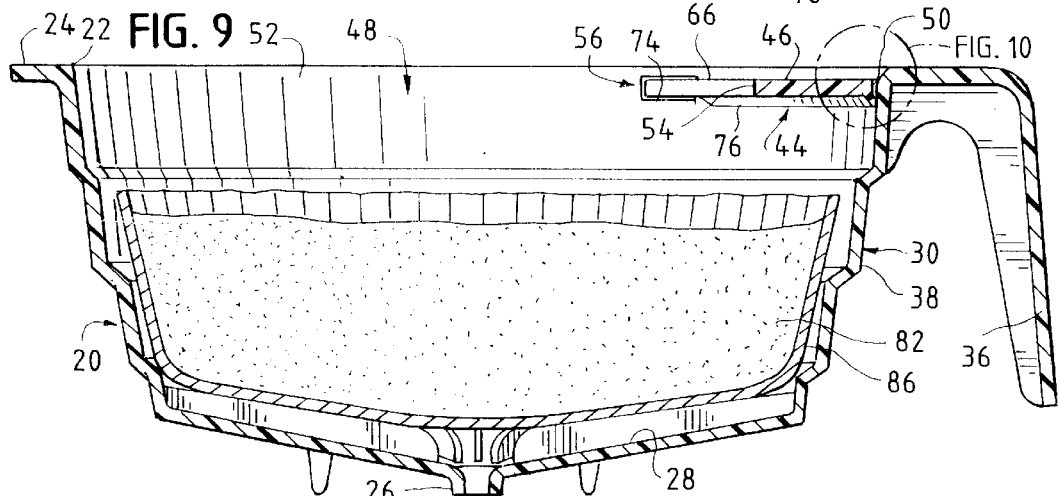
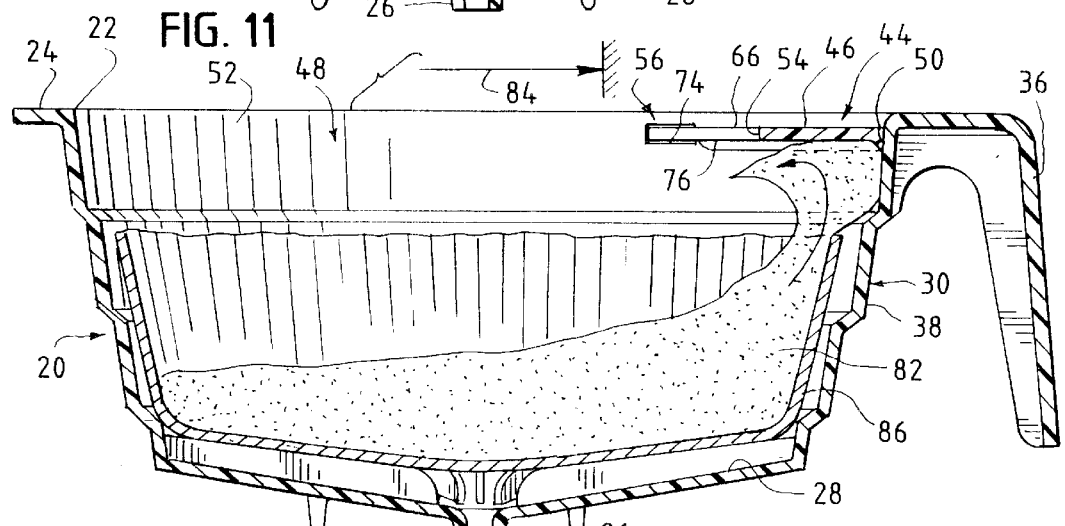
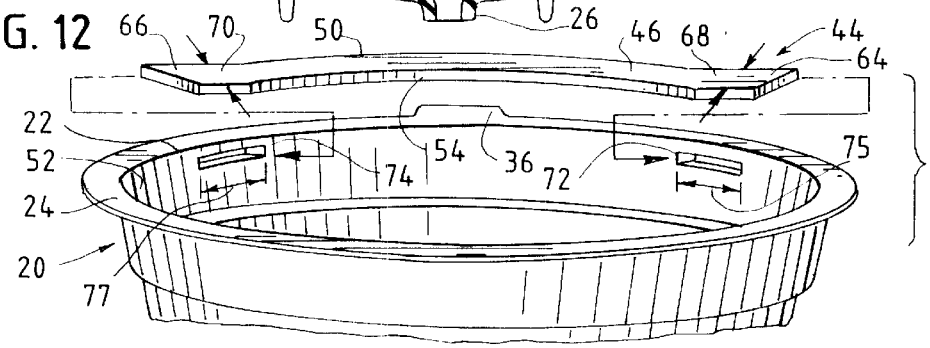

BREWING FUNNEL HAVING A LIQUID SHIELD

CROSS REFERENCE

This application is a continuation-in-part application of and claims priority under 35 USC Section 120 to U.S. application Ser. No. 29/125,043, filed Jun. 16, 2000 which has issued as U.S. Pat. No. D439,798, issued Apr. 3, 2001, which is assigned to the assignee of the present application and which patent is expressly incorporated herein by reference.

BACKGROUND AND SUMMARY OF THE INVENTION

The present invention relates to a funnel liquid shield, for use in brewing funnels which can retain either a brewing substance or a combination of a filter and a brewing substance for infusion with heated water to produce a liquid brewed beverage.

A variety of brewing funnels are available which are used to support filter papers or permanent filters containing a beverage brewing substance, such as tea or ground coffee. Such a brewing funnel is attached to a brewing apparatus so that heated water can be sprayed over the brewing substance to infuse the substance and produce a liquid brewed beverage. The brewed beverage drains from the bottom of the funnel and into a carafe or pot position there below.

An object of the present invention is to provide a liquid shield for use with a brewing funnel to prevent unintentional escape of brewing substance and water from the funnel.

Another object of the present invention is to provide a funnel including a liquid shield to prevent unintentional escape of brewing substance and water from the funnel.

A further object of the present invention is to provide a funnel for receiving a liquid shield to prevent unintentional escape of brewing substance and water from the funnel.

Additional features and advantages of the invention will become apparent to those skilled in the art upon consideration of the following detailed description and preferred embodiment exemplifying the best mode of carrying out the invention as presently perceived.

BRIEF DESCRIPTION OF THE DRAWINGS

The detailed description particularly refers to the accompanying figures in which:

FIG. 1 is a partial fragmentary perspective view of a brewing funnel having a liquid shield retained therein;

FIG. 2 is a top plan view of the shield;

FIG. 3 is a right elevational view of the shield;

FIG. 4 is a left elevational view of the shield;

FIG. 5 is a rear elevational view of the shield;

FIG. 6 is a bottom plan view of the shield;

FIG. 7 is a front elevational view of the shield;

FIG. 8 is an enlarged partial fragmentary cross-sectional view of the shield taken along line 8—8 in FIG. 2;

FIG. 9 is a cross-sectional view taken along line 9—9 in FIG. 1 showing a shield engaged with a funnel;

FIG. 10 is an enlarged partial fragmentary view showing a flanged depending from a body portion of the shield flexibly engaged against an inside surface of the funnel;

FIG. 11 is the cross-sectional view as shown in FIG. 9 in which brewing substance and water are deflected by the liquid shield into the funnel cavity; and FIG. 12 is an exploded prospective view of the shield disengaged from the funnel.

DETAILED DESCRIPTION

As shown in FIG. 1, a beverage funnel 20 is shown which has a generally frustoconical shape with a mouth 22 which is defined by an annular lip or rim 24. A drain aperture 26 (see FIGS. 9 and 10) is formed in a bottom surface 28 thereof. A sidewall 30 generally continuously extends around the brewing funnel 20 between the lip 24 and the bottom surface 28. While a generally frustoconical funnel shape having a circular cross-section is shown in FIG. 1, other forms of the funnel may be provided such as a generally rectangular or square cross-sectional shape, triangular cross-sectional shape or oval cross sectional shape. A handle 36 is provided on an outside surface 38 of the sidewall 30.

A liquid shield 44 is attached to the funnel 20 generally adjacent the handle or grip 36. It should be noted that the handle 36 could be any form of a gripping structure defined on the funnel 20 to facilitate gripping, grasping or otherwise handling the funnel 20. The liquid shield 44 is similar to the device as shown in U.S. Pat. No. 6,055,900 issued May 2, 2000 (the "'900 Patent") and assigned to the assignee of the present invention and which patent is incorporated herein by reference. The present invention is as improvement on a removable form of the splash shield 44. While a liquid shield was disclosed in the '900 patent, specific refinements have been made to provide a preferred embodiment of such a novel removable liquid shield 44.

The liquid shield 44 is formed of material that is resistant to moisture and heat, such as the material from which the funnel is formed or any other suitable material. The liquid shield 44 includes a body portion 46 which extends inwardly over at least a portion of a cavity 48 defined by the wall 30 mouth 22 and bottom 28 of the funnel 20. The body includes a first edge 50, generally proximate to the funnel and in particular an inside surface 52 of the wall 30. A second edge 54 is positioned generally opposite the first edge 50 extending over the cavity 48.

The shield 44 is attached to the funnel 20 by an attachment assembly 56. The attachment assembly 56 includes at least one outwardly extending attachment portion 58 on the body 46 on the shield 44. An attachment receptacle 60 is provided on a corresponding portion on the funnel 20 for receiving the attachment portion. The attachment structures 56 facilitate the removable engagement of the shield 44 on the funnel 20. It should be noted that the attachment assembly could be provided by reversal of the structures such that the funnel includes an extending portion which engages a corresponding receptacle on the shield 44. While this specific embodiment is not illustrated, one of ordinary skill in the art should be capable of reversing the structures without undue experimentation.

As shown in the Figures, the shield 44 includes a pair of spaced apart outwardly extending attachment portions. Corresponding spaced apart attachment receptacles 60 are provided in corresponding locations on the funnel. It is envisioned that the shield 44 may be attached to the funnel 20 using a single attachment portion and receptacle configuration. While such a configuration may be provided at either end of the shield, it may also be provided centrally located on the shield, so as to balance the opposite ends. Additional variations of the attachment assemblies 56 are contemplated herein, such as a plurality of such assemblies or even a single, generally continuous channel and tongue. The attachment assemblies 56 should be broadly construed. The attachment assemblies 56 provide structures which cause the shield 44 to be retained on the funnel 20 in a desired location. Alternative structures of such attachment assemblies may be employed to achieve substantially the same function and result.

The preferred embodiment employs two spaced-apart attachment assemblies 56 to help provide suitable engagement of the shield 44 with the funnel 20 yet providing generally easy removability without tools. It should be noted that the shield 44 attaches to the funnel 20 without the use of hardware, and hence no tools are required for attachment or removal of the shield 44. This is important as the National Sanitation Foundation has guidelines for use of devices and the removability of structures or components with and without tools. The preferred embodiment of the present invention shows a funnel 20 and shield 44 which have been designed to eliminate the need for hardware and tools and facilitates a high degree of sanitation.

With reference to FIGS. 2, 6 and 12, the shield 44 has two attachment portions in the form of first and second attachment portions, tabs, extensions or fingers 64, 66, respectively. The first tab 64 has a width dimension 68 which is different than a generally corresponding width dimension 70 of the second tab 66. As shown in the drawings first tab 64 has a smaller width dimension 68 than width dimension 70 of tab 66. Corresponding first and second receptacles, 72, 74, respectively (see FIG. 12) are provided on the funnel 20 for receiving the corresponding first and second tabs 64, 66. The receptables 72, 74 have corresponding width dimensions, 75, 77, respectively which correspond to the width dimensions 68, 70 respectively of the tabs 64, 66. The dimensional difference in the tabs 64, 66 is to cause the shield 44 to be oriented and engaged with the funnel 20 in a particular direction. In other words, the dimensional relationship between the tabs 64, 66 and receptacles 72, 74 assures that the shield 44 will be properly attached to the funnel 20. The attachment assemblies 56 should be broadly construed. Alternative structure such attachment assemblies may be engaged to achieve substantially the same function and result. The attachment assemblies 56 provide structures which cause the shield to be oriented in a desired direction for correct attachment or, if improperly oriented, prevent incorrect attachment.

As shown in the figures, the shield 44 includes a flange 76 which extends from the first edge 50. As shown in figures, the enlarged views of FIGS. 8 and 10, the flange 76 extends downwardly and slightly outwardly from the body 46 of the shield 44. As shown in FIGS. 9, 10 and 11, when the shield 44 is engaged with the funnel 20, the attachment assembly 56 is positioned in relation to the funnel and shield is dimensioned so as to cause the flange 76 to be slightly inwardly deflected by an inside surface 52 of the wall 30. Inward deflection of the flange 76 creates a spring force 78 which pushes on outside surface 80 of the flange 76 against the inside surface 52 of the funnel wall 30. The engagement of the flange 76 against the wall 30 with the spring loading of the flange 76 helps assure that the flange will closely abut the wall over the length of the flange, generally the first edge 50, to seal or close the edge against irregularities in the funnel wall 30.

Generally, the shield 44 is positioned below the mouth 22 proximate to the handle 36. While the design and placement of the shield 44 relative to the funnel 20 as shown in the figures, is generally symmetric relative to the handle 36, it is envisioned that there may be other relationships between the handle 36 and shield. For example, if the geometry of the funnel is different, the relationship of the movement of liquid and beverage brewing substance in the funnel may dictate placement of the shield 44 in a different location relative to the handle 36.

As shown in FIG. 11, the shield 44 prevents the material 82 in the funnel, typically liquid and beverage brewing substance in a slurry-form, from escaping the cavity 48 of the funnel 20. The shield 44 blocks passage or otherwise prevents escape of the material in the area near the handle 36. Typically, the shield will generally prevent escape of the material 82 should the funnel be removed from the brewer prior to completion of the brewing process. If the funnel 20 is removed from the brewer while there is still material 82 therein, the material may develop a great degree of momentum 84 toward the handle 36. The shield 44 causes the material 82 to be redirected and deflected back into the cavity 48.

During a brewing operation, the funnel 20 is situated within a brewing apparatus with the handle 36 in a position such that the funnel can be removed from the brewing apparatus when the brewing process is complete. A filter 86 is positioned in the cavity 48 with a charge of beverage brewing substance placed therein. During the brewing process, water is sprayed from a nozzle of the brewing apparatus through the mouth 22 and onto the brewing substance. One of ordinary skill in the art will appreciate the method of brewing as described herein above. The water and brewing substance begin the process of infusion whereby water and the brewing substance mixed together to form the material 82 from which brewed beverage is drained through the filter 86 and through the drain aperture 26. The shield 44 is sized and dimensioned so as to allow the spray head to dispense water over the beverage brewing substance during the brewing process but to prevent escape of material from the funnel.

In use, the funnel 20 is provided for receiving the shield 44 therein. The shield 44 is positioned with the first tab 64 positioned for engagement with the first receptable 72 and the second tab 66 position for engagement with the second receptacle 74. The body 46 of the shield 44 may need to be curved slightly when engaging the tabs 64, 66 with the receptacle 72, 74. Due to the dimensional differences between the tabs 64, 66 and the dimensional relationship between the corresponding receptacle 72, 74, the shield 44 will only be received by the funnel in a proper orientation. Once the shield 44 is properly positioned in the funnel 20, the flange 76 is slightly inwardly deflected by engagement against the inside surface 52 of the wall 30. The spring force 78 in the flange 76 creates a sealing effect against the inside surface 52. Generally, the flange 76 is formed as an integral component of the body 46. Alternatively, the flange 76 could be separate piece of material suitably attached to a separate body portion providing substantially the same function in substantially the same way to achieve substantially the same results.

The shield 44 as illustrated is attached to the funnel 20 without the need for additional separate hardware, whether or not captive, and without the use of tools. The simplified attachment of the shield 44 on the funnel 20 allows for attachment and removal of the shield, even while wearing protective or sanitation gloves. By positioning the shield 44 near the mouth 22, the funnel 20 can accommodate a standard filter and does not require a custom sized filter for operation of the brewing apparatus.

What is claimed is:

1. A brewing funnel and liquid shield combination for blocking passage of material from the funnel, comprising:

the funnel having at least one sidewall defining a cavity therein, a drain opening and a bottom surface of the funnel, and a rim situated along an upper edge above the sidewall, the rim defining a mouth, a handle extending from the funnel, and spaced apart receptacles positioned in the sidewall proximate the handle;

the liquid shield including a body portion for extending inwardly over at least a portion of the cavity of the funnel, the body portion being positionable adjacent the handle, the body having at least a first edge proximate the side wall of the funnel and a second edge generally opposite the first edge and positioned generally in the cavity, at least two spaced apart outwardly extending attachment portions, extending from the body portion being sized for engagement with a corresponding one of the receptacles for removably retaining the shield on the funnel, a flange extending from at least a portion of the first edge for abutting an inside surface of the sidewall of the funnel for blocking passage of material between the shield and the funnel.

2. The brewing funnel and liquid shield combination of claim 1, wherein the at least two spaced apart outwardly extending attachment portions of the body of the liquid shield having a different dimension to facilitate proper orientation of the liquid shield for locating the liquid shield in a desired orientation and engagement on the brewing funnel.

3. The brewing funnel and liquid shield combination of claim 1, wherein the flange is flexible and is flexed inwardly when the liquid shield is attached to the funnel.

4. The brewing funnel and liquid shield combination of claim 1, wherein the shield is being positioned along an inside surface of the funnel with the flange generally abutting the inside surface of the funnel for blocking passage of material from the cavity in the funnel.

5. The brewing funnel and liquid shield combination of claim 1, wherein the flange extends downwardly and generally outwardly from the first edge of the body of the shield and being formed of a suitably flexible material so as to flexibly engage an inside surface of the funnel.

6. A liquid shield for use with a bring funnel, a funnel defining a cavity therein and having a handle extending therefrom, the shield comprising:

a body portion for extending inwardly over at least a portion of a cavity of a funnel, the body portion generally being positionable adjacent a handle, the body having at least a first edge proximate to a funnel and a second edge generally opposite the first edge and positioned in a cavity;

at least one attachment portion on the body portion, the attachment portion engaging a funnel for removably retaining the shield on a funnel;

a flange extending from at least a portion of the first edge for blocking passage of material between the shield and a funnel; and a pair of outwardly extending attachment portions on the body, each of the attachment portions having a different dimension to facilitate proper orientation of the shield for locating the shield in a desired orientation and engagement on a funnel.

7. The liquid shield of claim 6, wherein the flange is flexible and generally is flexed inwardly when the shield is attached to a funnel.

8. The liquid shield of claim 6, wherein the shield being positioned along an inside surface of a funnel with the flange generally abutting an inside surface of a funnel for blocking passage of material from a cavity in a funnel.

9. The liquid shield of claim 6, wherein the flange extends downwardly and generally outwardly from the first edge and being formed of a suitably flexible material so as to flexibly engage an inside surface of a funnel.

10. A brewing funnel for retaining a brewing substance and water during an infusion process and draining a brewed beverage therefrom, the funnel being formed for use with a liquid shield to prevent unintentional escape of brewing substance and water from the funnel, the brewing funnel comprising:

at least one side wall defining a cavity in the funnel;

a drain opening generally in a bottom surface of the funnel;

a rim along an upper edge of the side wall;

a handle extending from the funnel; and engaging structure on the funnel for removably engaging the attachment portion of the liquid shield for retaining the shield proximate the handle, and the attachment portion includes at least a pair of spaced apart extensions depending from the shield, and the engaging structure of the funnel comprising at least a pair of corresponding spaced apart receptacles for receiving the extensions therein for removably retaining the liquid shield on the brewing funnel.

* * * * *

UNITED STATES PATENT AND TRADEMARK OFFICE
CERTIFICATE OF CORRECTION

PATENT NO.       : 6,497,818 B1
APPLICATION NO.  : 09/772515
DATED            : December 24, 2002
INVENTOR(S)      : Arthur H. Bunn It is certified that error appears in the above-identified patent and that said Letters Patent is hereby corrected as shown below:

Title page, Column 1, INID code (73), the Assignee name should read
--Bunn-O-Matic Corporation--

Signed and Sealed this

Twenty-first Day of August, 2007

JON W. DUDAS
*Director of the United States Patent and Trademark Office*